(12) United States Patent
Turc et al.

(10) Patent No.: US 7,988,869 B2
(45) Date of Patent: Aug. 2, 2011

(54) REACTOR AND METHOD FOR ANOXIC TREATMENT OF A MATERIAL IN A FLUID REACTION MEDIUM

(75) Inventors: Hubert-Alexandre Turc, Les Angles (FR); Christophe Joussot-Dubien, Rochefort du Gard (FR)

(73) Assignee: Commissariat a l'Energie Atomique (FR)

( * ) Notice: Subject to any disclaimer, the term of this patent is extended or adjusted under 35 U.S.C. 154(b) by 22 days.

(21) Appl. No.: 12/066,122

(22) PCT Filed: Sep. 26, 2006

(86) PCT No.: PCT/EP2006/066724
§ 371 (c)(1),
(2), (4) Date: Mar. 7, 2008

(87) PCT Pub. No.: WO2007/036512
PCT Pub. Date: Apr. 5, 2007

(65) Prior Publication Data
US 2009/0127209 A1   May 21, 2009

(30) Foreign Application Priority Data
Sep. 28, 2005   (FR) ...................................... 05 52926

(51) Int. Cl.
*C02F 1/72*   (2006.01)
(52) U.S. Cl. ..... 210/758; 210/178; 210/179; 422/184.1; 422/226; 366/291
(58) Field of Classification Search .................. 210/758, 210/760, 761, 766, 177, 178, 205, 219, 179, 210/407, 413, 414, 415; 422/184.1, 198, 422/224, 225, 226, 229, 236, 242; 366/261, 366/290, 291, 292, 297
See application file for complete search history.

(56) References Cited

U.S. PATENT DOCUMENTS

| 3,206,287 | A | * | 9/1965 | Crawford ...................... 422/198 |
| 3,649,534 | A |   | 3/1972 | Schotte |
| 4,564,458 | A |   | 1/1986 | Burleson |
| 5,008,085 | A | * | 4/1991 | Bain et al. ...................... 210/761 |
| 5,421,998 | A |   | 6/1995 | Li et al. |
| 5,536,385 | A |   | 7/1996 | Sheldon et al. |
| 5,552,039 | A |   | 9/1996 | McBrayer, Jr. et al. |
| 6,090,291 | A | * | 7/2000 | Akai et al. ...................... 210/205 |

FOREIGN PATENT DOCUMENTS

FR   2814967   10/2000

OTHER PUBLICATIONS

Foy et al., "Reduction of Nitrate and Nitrite Salts Under Hydrothermal Conditions," Proceedings of the 12th International Conference on the Properties of Water and Steam, Sep. 1994.*
Examination report for PCT/EP2006/066724 dated Sep. 2008.

* cited by examiner

*Primary Examiner* — Matthew O Savage
*Assistant Examiner* — Lucas Stelling
(74) *Attorney, Agent, or Firm* — Baker Hostetler, LLP

(57) ABSTRACT

A reactor for treating with pressurized water a material in a fluid reaction medium. It comprises a body (2) delimiting a reaction area (10), an inlet (48) for the material to be treated in the reaction area (10), a point (46) for introducing an oxidant into the reaction area (10), at least one outlet for the treated material outside the reaction area (10), the material to be treated follows a path defined in the reaction area between its inlet and its outlet. The point (46) for introducing the oxidant in the reaction area (10) is located downstream from the inlet (48) for the material and is spaced apart from the latter by a certain distance so as to define an anoxic area (20) comprised between the inlet for the material to be treated and the point for introducing the oxidant, an area in which the fluid medium is in anoxia.

5 Claims, 2 Drawing Sheets

REACTOR AND METHOD FOR ANOXIC TREATMENT OF A MATERIAL IN A FLUID REACTION MEDIUM

The invention relates to a reactor for treating in pressurized water a material in a fluid reaction medium, comprising a body delimiting a reaction area, an inlet for the material to be treated in the reaction area, a point for introducing an oxidant into the reaction area, at least one outlet for the material treated outside the reaction area, the material to be treated following a predefined path in the reaction area between its inlet and its outlet.

It also relates to a method for treating in pressurized water a material in a fluid reaction medium contained in a reaction area of a reactor. It comprises the following steps:
- introducing a material to be treated in the reaction area;
- introducing an oxidant in the reaction area;
- discharging the material to be treated out of the reaction area.

In the field of pressurized methods for treating materials, in particular waste materials, two large families of methods which use water as a reaction medium, are identified: wet oxidation (WO) processes and hydrothermal oxidation (HO) processes. WO is characterized by conditions of lower temperature and pressure than the critical conditions of water. It operates therefore under biphasic conditions and leads to mineralization kinetics of one or even two orders of magnitude longer than those obtained in HO.

Hydrothermal (HO) oxidation processes in supercritical water use the particular properties of water for pressure and temperature above 221 bars and 374° C. and in particular its low dielectric constant allowing solubilization of hydrophobic compounds, its low density and viscosity allowing mixing in any proportions with gaseous compounds. The obtained reaction medium allows intimate and homogeneous mixing between organic compounds and oxygen having the function of fuel and oxidizer in the mineralization reaction which may then be spontaneously initiated by the temperature of the medium. Gases such as $O_2$, $CO_2$, $N_2$ are totally soluble in water as well as many alkanes. These combustions may then take place without the interphasic transfer limitation generally observed at low temperatures or at low pressures, like in incinerators or wet oxidation processes, and lead to total mineralization of the organic matrix within dwelling times of the order of one minute. HO processes are therefore particularly suitable for treating waste materials requiring total destruction of their organic matrix.

The invention applies both to We processes and to HO processes which will be called in their global nature, pressurized water processes. However, HO processes are its preferred application. Indeed, the HO high temperature and high pressure operating conditions make its application even more advantageous, A process and a reactor of this type is already known (FR-2 814 967). The reactor includes a body in which is positioned an internal tube which externally delimits a ring-shaped area with the body and inside, a central area called a lumen. The internal tube includes a first end attached to a first end of the body and a second end which leaves a passage for communication between the ring-shaped area and the central area. According to this method, the constituents of the supercritical medium, i.e. water and an oxidant, are introduced into the vicinity of the first end of the reactor under a pressure above 22.1 MPa. They are heated to a temperature above 374° C. in the ring-shaped area and then introduced into the internal tube at the second end of the reactor at the same time as the material to be treated. A heated mixture of pressurized water/oxidant fluid and of material to be treated is oxidized in a first portion of the internal tube and then cooled in a second portion of this tube.

A method and a reactor of this type are suitable for neutralizing certain waste compounds which are in an already high oxidation degree, notably nitrates.

The object of the invention is a reactor and a method which remedy these drawbacks.

These objects are achieved, according to the invention, by the fact that the point for introducing the oxidant into the reaction area of the reactor is located downstream from the inlet for the material to be treated and is spaced apart from the latter by a certain distance so as to define an anoxic area comprised between the inlet of the material to be treated and the point for introducing the oxidant, an area wherein the fluid medium is in anoxia. Preferably, an oxidation area is located downstream from the anoxic area, an area wherein the waste oxidation reaction is finalized.

The material to be treated may be introduced as a liquid, like in the case of the method described in Patent FR-2 814 967. It may then be introduced by a simple standalone pump. According to the invention, the variability of the nature of the waste material to be treated may also be increased. Thus, the material may also be introduced as suspended solid particles.

According to the method, introducing the oxidant of the reaction area is carried out at an introduction point located downstream from the inlet for the material to be treated and spaced apart from the latter by a certain distance in order to define an anoxic area comprised between the inlet of the material to be treated and the point for introducing the oxidant, an area wherein the fluid medium is in anoxia.

The method and reactor of the invention allow the reaction of all the compounds of the waste material, in particular nitrates.

The organic material contained by the waste is oxidized by the nitrates. The latter are reduced and therefore converted into stable $N_2$ under the HO conditions. Thus, with the anoxic area, oxidant species (for example nitrates) may be reduced by a reaction with the waste materials. The oxidant species are reduced upon contact with the waste materials which are themselves oxidized.

Further, the oxidation area located downstream from the anoxic area allows the oxidation reaction of the waste materials to be completely finished independently of the amounts of reagents. Indeed, the amount of oxidant species is not generally sufficient, neither is the contact time long enough for all the waste materials to be oxidized. The fact of adding an oxidant (for example air) allows the oxidation reaction to be finalized. A dual result is therefore obtained: reduction of the nitrates in the anoxic area on the one hand but also oxidation of the whole waste in the oxidation area.

In a particular embodiment, the reactor includes an internal tube sealably attached to the body at a first end, the interior volume of the internal tube delimiting a central area, the internal tube delimiting a ring-shaped area with the body, a passage for communication between the central area of the tube and the ring-shaped area being provided at a second end of the internal tube, an inlet for the material to be treated, which opens out into the central area of the internal tube, on the side of its first end, an inlet for the oxidant, which may open out into the ring-shaped area, the point for introducing the oxidant being located in the vicinity of the second end of the internal tube.

Other characteristics and advantages of the invention will further become apparent upon reading the description which follows of an exemplary embodiment given as an illustration, with reference to the appended drawings. In these figures.

Figure 1:
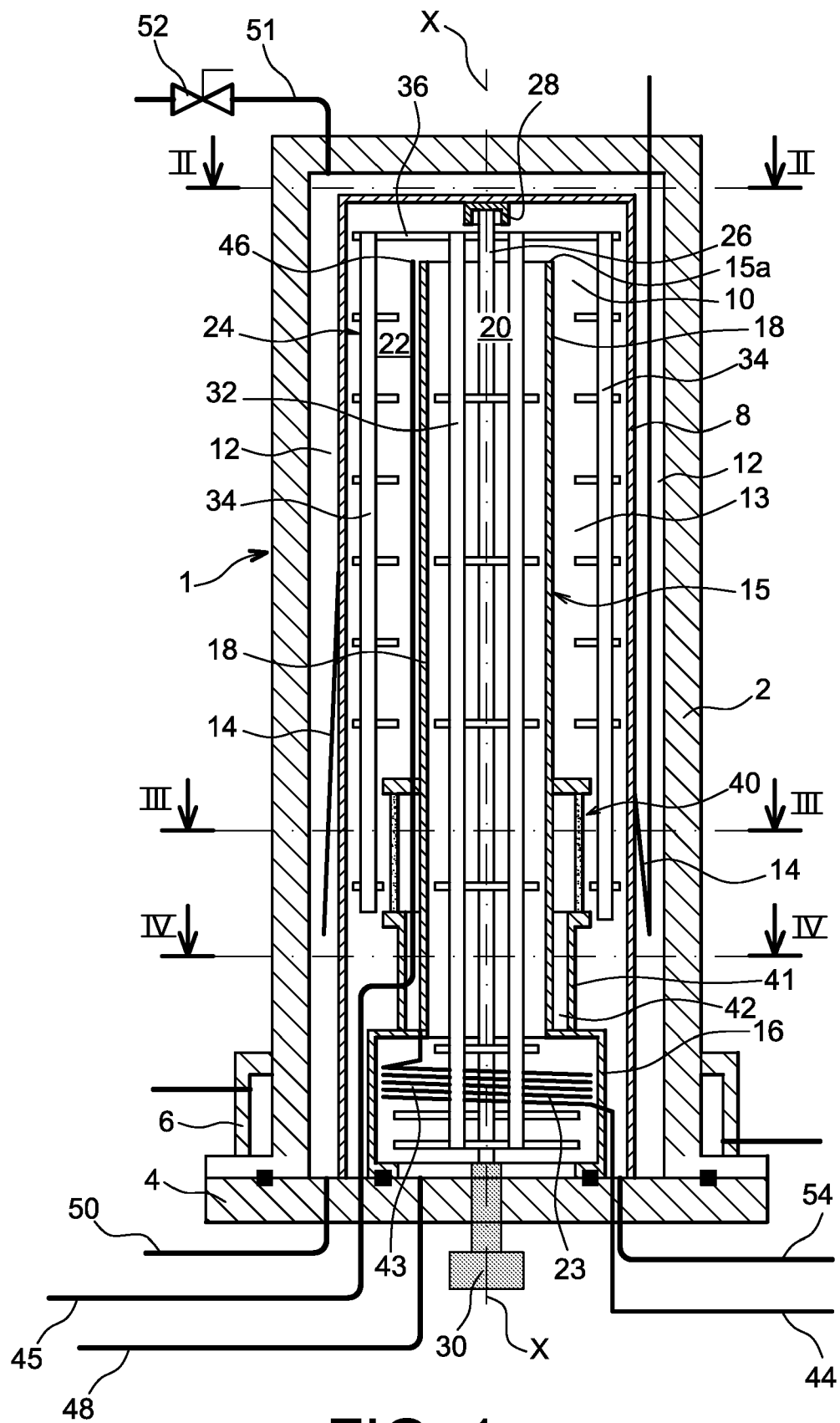
FIG. 1 is a longitudinal sectional view of a reactor according to the present invention.
Figure 2:
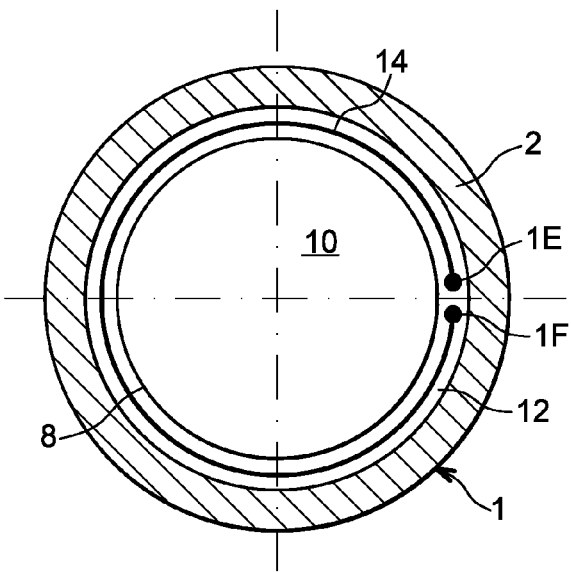
FIG. 2 is a sectional view along the line II-II of FIG. 1.
Figure 3:
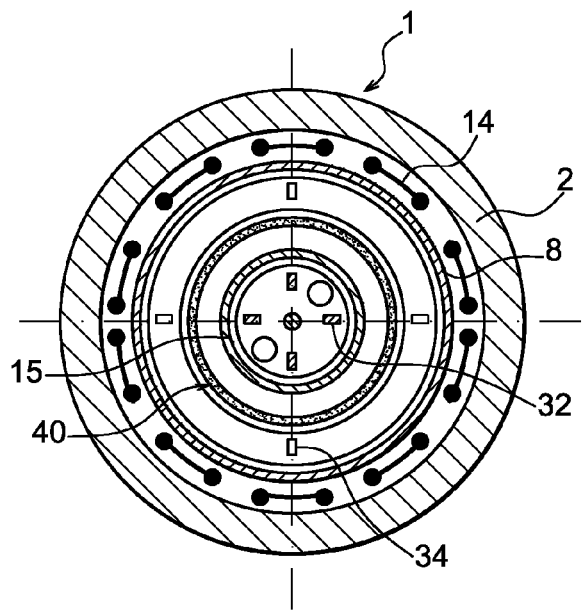
FIG. 3 is a sectional view of the reactor of FIG. 1 along the line II-III.
Figure 4:
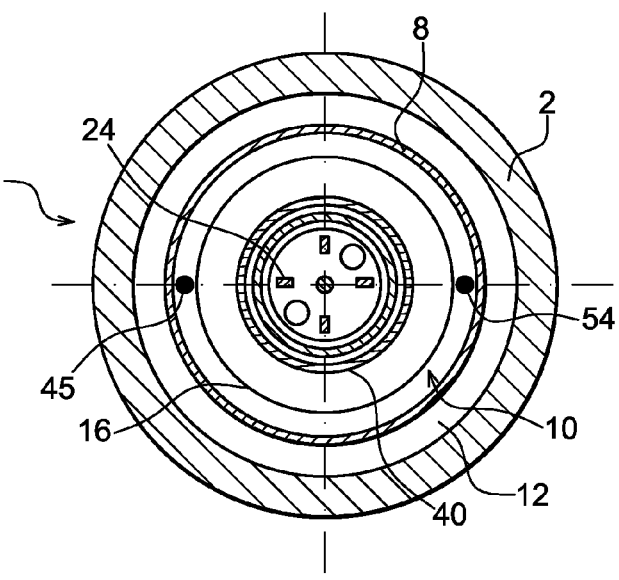
FIG. 4 is a sectional view along the line IV-IV of the reactor illustrated in FIG. 1.

In the figures, the reactor, designated by the general reference 1, consists of a body 2 of a general cylindrical shape with an axis XX, closed at its upper portion by a bottom and at its lower portion by a lid 4.

The lower end of the reactor 1 is kept cold by a double jacket 6 in which flows a coolant fluid, for example water. With this arrangement it is possible to provide a cold high pressure seal between the body 2 and the lid 4 by a gasket in Viton or of the metal type.

A protective casing 8 is positioned inside the body 2 and spaced apart from the latter so as to delimit inside a reaction area 10 and outside a confinement area 12 sealably isolated from each other.

The protective casing 8 has a general cylindrical shape, blind at its upper end. It is mounted coaxially with the body 2 of the reactor and is dimensioned so that the plays on the diameter and the length of the casing may be minimized. It is made in a non-porous material but resistant to corrosion such as titanium.

The attachment of this casing may be made on the lid, as illustrated in FIG. 1, or on the body 2 of the reactor. The cold seal between the casing and body and lid is provided by a Viton gasket, for example.

A primary heat exchanger 14 is provided in the ring-shaped area 12. By having a heat transfer fluid circulate in the primary exchanger 14, it is possible to heat or to extract heat power. It also provides control of the thermal gradients along the reactor. However, the circuit on which the exchanger is provided is not part of the invention. It will therefore not be described in detail.

The use of the protective casing 8 immersed on either side in a pressurized fluid allows the use of stainless steel piping for making the internal heat exchanger 14 which is subject to compression stress and not to tensile stress like the material of the reactor. The walls of the exchanger may therefore be thin, exactly like those of the protective casing, and the heat transfer between the reaction medium and the heat transfer fluid is considerably improved as compared with a more conventional configuration where the exchanger is placed on the outer wall of the reactor.

An internal tube designated as a whole by reference 15, is positioned in the reaction area 10 coaxially with the XX axis of the body. It includes a lower portion 16 with a larger diameter and an upper portion 18 with a smaller diameter. The tube 15 includes an open end 15a which provides a passage for communication between the central area 20 and the ring-shaped area 22.

A stirring turbine 24, positioned in the reaction area 10, includes a central shaft 26 of axis XX guided in rotation by a centering device 28 integral with the protective casing 8. The turbine is set into rotation, for example by means of a magnetic drive 30 mounted on the lid 4. It includes blades 32 parallel to the axis 26 positioned in the internal tube 18 and blades 34 also parallel to the axis 26 positioned in the reactive ring-shaped area 22. The blades 32 of the central area 20 and the blades 34 of the ring-shaped area 22 are connected through a coupling 36.

Heat transfers from and to the primary exchanger 14 are improved if the flow of the fluids in the reaction ring-shaped area 22 is turbulent. This point is guaranteed by stirring with the blades 34. Homogeneity in the reaction area is also guaranteed by this device, even in the case when the fluid movements are limited in the direction of flow in order to approach a dwelling time distribution similar to the one existing in piston type flow. The stirring turbine 24 therefore provides decoupling of the heat transfer from the flow of the process fluid.

The totality of the equipment internal to the reaction area operates at quasi equal pressure so that the materials and geometries may be retained without having to take into account requirements of mechanical resistance to pressure. The waste injector tube, the oxidant injector and the outlet exchanger are made in materials resistant to HO corrosion, such as titanium and their thicknesses may be minimized in order to improve heat transfer for which they are the origin.

A cylindrical filtration device 40 is mounted coaxially with the internal injection tube 15 and more specifically, with the portion 18 of smaller diameter of this tube. The filtration device 40 is extended downwards with a ferrule 41 which is also coaxial with the axis XX of the injection tube 15 and which delimits a ring-shaped space 42 with the tube 15.

A tube 43 wound as a coil forming a heat exchanger opens out at one end in the ring-shaped area 42 and at another end 44 outside the reactor 1.

A conduit 45 for feeding an oxidant, for example pressurized air, passes through the lid 4 at the reaction ring-shaped area 22. The conduit 45 extends substantially parallel to the axis XX over the whole length of the internal tube 15 so as to have an end 46 which opens out in the vicinity of the upper end 15a of this tube.

The waste material to be treated penetrates under pressure and at the rated flow through a conduit 48 which passes through the lid 4 in order to open out inside the central reaction area 20. Finally, a conduit 50 allows a pressurized fluid medium, for example water, to be introduced into the confinement area 12. Advantageously, the confinement area is in overpressure with respect to the reaction area, which allows failure of the seal of the protective casing to be detected.

A conduit 51 on which is mounted a fluid purge valve 52 is mounted to the upper portion of the body 2.

Finally, a conduit 54 passes through the lid at the reaction area 52.

The material treatment method takes place in the following way.

The material to be treated penetrates into the central area 20 through the conduit 48 at a rated pressure and flow entirely as a liquid, or as an aqueous suspension containing suspended solid material particles. The material to be treated heats up by flowing against the current of fluid effluent which flows in the exchanger 43 positioned in the portion with a larger diameter 16 of the injection tube 15. The material to be treated then travels through the portion of smaller diameter 18 of the injection tube from its lower end right up to its open end 15a. Given that the end 46 of the tube which allows an oxidant to be injected into the reaction area 10, opens out in the vicinity of the end 15a of the injection tube, the whole central area 20 is in an anoxic condition. It is possible to optimize the location of the oxidant injector 46 and to exploit a portion of the reaction area under supercritical conditions but in anoxia. Depending on the position of the injection of air, the waste material contained in the central injection area may be entirely, partly, or not at all, maintained under anoxic conditions before the oxidizing combustion begins.

The oxidant may be introduced as a gas (air or air enriched in oxygen, ozone, etc.) or as a liquid (liquid oxygen, hydrogen peroxide, etc.).

The purpose of this configuration is to allow the reaction of certain compounds from the waste in order to ensure their removal. For example, in the case when the organic waste contains nitrates which have to be removed, the organic material which it contains is oxidized by the latter, which are converted into stable $N_2$ under HO conditions. Oxidation which results from this, after adding an oxidant at the end of the tube 15a, does not lead to new production of nitrates but to the transformation of the other organic compounds, notably the carbonaceous species, into $CO_2$. It is thus possible to remove certain waste materials which would not be removed with a traditional HO process.

Thus, the invention advantageously applies to the treatment of agricultural effluents. The use of an anoxic area of the reactor allows the destruction of nitrated effluents without producing nitrogen-containing species in the effluents. By separating a brine concentrating the minerals and releasing a majority flow of stripped aqueous effluent, this treatment may be applied to effluents of intensive breeding farms, such as liquid manures, rich in nitrates and phosphates. The design of HO processes for recovering energy from waste materials and the dimensions of which may be adapted on a case-by-case basis, leads to considering the creation of small units integrated to the breeding business, and utilized instead of the usual spreading operations performed by the breeders, and participating in the production of energy required for the facility.

The material to be treated then travels through the reaction ring-shaped area 22 from top to bottom right up to the microporous filter 40. By means of the stirrer with straight blades 24, it is possible to guarantee turbulence conditions so that filtration is provided under conditions analogous to tangential filtration and not like a filtration of the frontal type by avoiding the formation of cake, i.e. a build-up of solid material in front of the filter. The formation of this cake is standard in frontal filtration. It strongly reduces the filtering capacity of the component. In the turbulent flow conditions which are sought in the reactor of the invention, a tangential flow to the filter is maintained in order to avoid this build-up of material and to thereby guarantee a filtration efficiency as constant as possible over time.

The invention claimed is:

1. A reactor for treating a nitrate containing organic waste in supercritical water in a reactor, comprising a body (2) closed by a lid, a casing located within the body for forming an enclosed supercritical reaction area (10) having a pressure of at least 221 bars and for forming a confinement area isolated by the casing from the reaction area, an inlet (48) for introducing the organic waste into the supercritical reaction area (10), an internal tube (15) disposed in the supercritical reaction area (10) coaxial with the longitudinal axis of the body for forming a ring shaped area between the internal tube and the casing and forming a central area within the body and said reactor further comprising: at least a first and second end with the second end (15a) spaced from the inlet (48); a location (46) for introducing an oxidant into the supercritical reaction area (10), at least one outlet for discharging oxidized organic waste out from the supercritical reaction area (10), with said organic waste to be treated in the supercritical reaction area following a path defined between its inlet and its outlet, characterized in that the location (46) for introducing the oxidant into the supercritical reaction area (10) is located in the vicinity of the second end (15a) of the internal tube (15) downstream from the inlet (48) and is spaced apart from the latter for establishing an anoxic area in which the organic waste is in anoxia confined to said central area between the inlet for the organic waste and the location for introducing the oxidant, a heat exchanger disposed in said confinement area to heat or to extract heat power from the reaction area and to provide control of thermal gradients along the reactor and a rotatable turbine disposed in the reaction area with said turbine having a central shaft extending through the central area coaxial to the casing and first and second rotatable blades parallel to an axis of the reactor with the first blades positioned in the central area formed by the internal tube and the second blades positioned in the ring shaped area to enable said organic waste to be stirred.

2. The reactor according to claim 1, characterized in that an oxidation area is located downstream from the anoxic area, an area in which the oxidation reaction of the organic waste materials is finalized.

3. The reactor according to claim 1, wherein said internal tube (15) is attached to the body (2) at said first end, with the interior volume of the internal tube (2) defining said central area (20), and providing a passage for communication between the central area (20) of the tube and the ring-shaped area (22) at said second end (15a) of the internal tube, and wherein said inlet (48) for the organic waste material to be treated, opens out into the central area (20) of the internal tube, on the side of its first end, with the location (46) for the oxidant for introducing the oxidant being located in the vicinity of the second end (15a) of the internal tube.

4. A method for treating a nitrate containing organic waste in supercritical water in a reactor comprising a body closed by a lid, a casing located within the body for forming an enclosed supercritical reaction area having a pressure of at least 221 bars and a confinement area isolated by the casing from the reaction area, an internal tube attached to the body in said supercritical reaction area for forming a ring shaped area between the internal tube and the casing and for forming a central area within the body and with the reactor having an inlet for the introduction of said organic waste into said internal tube, said internal tube having a first end and a second end with the second end spaced from said inlet, an introduction point located downstream from said inlet and in the vicinity of said second end of said internal tube for introducing an oxidant into said supercritical reaction area, the method comprising the following steps:

introducing said nitrate containing organic waste into the supercritical reaction area (10) through the inlet of said internal tube to cause said nitrates to oxidize said organic waste and with the nitrates converted into stable $N_2$ in an anoxic condition between said inlet and said introduction point;

introducing an oxidant at said introduction point for the further oxidation of said organic waste without the production of nitrates;

using a heat exchanger disposed in said confinement area to heat or extract heat power from the reaction area for providing control of thermal gradients in the reactor; and stirring said nitrate containing organic waste by means of a rotatable turbine positioned in the reaction area with said turbine including first and second rotatable blades parallel to an axis of the reactor with the first blades positioned in the central area formed by the internal tube and the second blades positioned in the ring shaped area so as to enable said organic waste to be stirred.

5. The method according to claim 4, wherein said internal tube is attached to the body at said a first end, and has an interior volume defining said central area and providing a passage for communication between the central area of the tube and the ring-shaped area at said second end of the internal tube, and wherein said inlet for the organic waste material to be treated, opens out into the central area of the internal tube, on the side of its first end, with the point for introducing the oxidant being located in the vicinity of the second end of the internal tube.

* * * * *